US 11,050,444 B2

(12) United States Patent
Perthold

(10) Patent No.: US 11,050,444 B2
(45) Date of Patent: Jun. 29, 2021

(54) HIGH-FREQUENCY SIGNAL STIMULATOR SYSTEM

(71) Applicant: Innovationszentrum für Telekommunikationstechnik GmbH IZT, Erlangen (DE)

(72) Inventor: Rainer Perthold, Weisendorf (DE)

(73) Assignee: Innovationszentrum für Telekommunikationstechnik GmbH IZT, Erlangen (DE)

( * ) Notice: Subject to any disclaimer, the term of this patent is extended or adjusted under 35 U.S.C. 154(b) by 0 days.

(21) Appl. No.: 16/943,965

(22) Filed: Jul. 30, 2020

(65) Prior Publication Data

US 2020/0358462 A1 Nov. 12, 2020

Related U.S. Application Data

(63) Continuation of application No. PCT/EP2019/052234, filed on Jan. 30, 2019.

(30) Foreign Application Priority Data

Jan. 31, 2018 (DE) .......................... 102018201473.6

(51) Int. Cl.
*H04B 1/00* (2006.01)
*H04B 1/48* (2006.01)
*G06F 1/02* (2006.01)

(52) U.S. Cl.
CPC ........... *H04B 1/0014* (2013.01); *G06F 1/022* (2013.01); *H04B 1/48* (2013.01)

(58) Field of Classification Search
CPC ..... H04L 2025/03426; H04L 2025/067; H04L 2025/0204; H04L 1/0054
(Continued)

(56) References Cited

U.S. PATENT DOCUMENTS 7,106,806 B1 9/2006 Kenington
8,549,060 B2 * 10/2013 Gruener .................. G01S 3/026
708/405

(Continued)

FOREIGN PATENT DOCUMENTS

DE 10256620 A1 7/2004
DE 102015215222 A1 2/2017
(Continued)

OTHER PUBLICATIONS

Perthold, Rainer, et al., "A high performance digital channel simulator for satellite transmissions", 2008 10th International Workshop on Signal Processing for Space Communications (SPSC), Rhodes Island, Greece, IEEE, Piscataway, NJ, USA, Oct. 6, 2008 (Oct. 6, 2008), pp. 1-6, XP031365879, 2008.

*Primary Examiner* — Shuwang Liu
*Assistant Examiner* — Gina M McKie
(74) *Attorney, Agent, or Firm* — Michael A. Glenn; Perkins Coie LLP

(57) ABSTRACT

A high-frequency signal stimulator system has at least two mutually independent data producers, signal processing and a signal generator. The at least two mutually independent data producers are each configured to produce at least one data packet describing a high-frequency signal to be produced. The signal processing is configured to extract a signal of the data packet produced by the first of the at least two mutually independent data producers and contents of the data packet produced by the second of the at least two mutually independent data producers. The signal generator is configured to produce a high-frequency signal based on the extracted contents.

19 Claims, 5 Drawing Sheets

(58) Field of Classification Search
USPC .......................................................... 375/262
See application file for complete search history.

(56) References Cited

U.S. PATENT DOCUMENTS

| | | |
|---|---|---|
| 2006/0164292 A1 | 7/2006 | Buechler et al. |
| 2007/0004351 A1 | 1/2007 | Dekker |
| 2010/0148986 A1 | 6/2010 | Aunkofer et al. |
| 2013/0107918 A1* | 5/2013 | Tomisawa ................ H04B 1/40 375/219 |
| 2014/0364067 A1* | 12/2014 | Hsieh ..................... H04B 17/21 455/73 |
| 2015/0288463 A1* | 10/2015 | Perthold ................ H04B 17/14 375/224 |
| 2018/0167033 A1 | 6/2018 | Perthold |

FOREIGN PATENT DOCUMENTS

| | | |
|---|---|---|
| WO | 2008031504 A1 | 3/2008 |
| WO | 102007010888 A1 | 10/2008 |

\* cited by examiner

# HIGH-FREQUENCY SIGNAL STIMULATOR SYSTEM

CROSS-REFERENCE TO RELATED APPLICATIONS

This application is a continuation of copending International Application No. PCT/EP2019/052234, filed Jan. 30, 2019, which is incorporated herein by reference in its entirety, and additionally claims priority from German Application No. 102018201473.6, filed Jan. 31, 2018, which is also incorporated herein by reference in its entirety.

BACKGROUND OF THE INVENTION

Embodiments of the present invention relate to a high-frequency signal stimulator system and to a corresponding method for stimulating a high-frequency signal.

High-frequency signals can be produced by means of a stimulator. Due to the bandwidth of such high-frequency signals (between 20 MHz and 3000 MHz, for example), in known technology, the overall frequency range is divided into fixed frequency blocks of, for example, 120 MHz each. An emitter is associated to each of these frequency blocks. In existing known systems, 127 exciters are, for example, used which are distributed to six DSP cards, for example. These six DSP cards are operated in parallel and all obtain information relating to the data to be produced from a data server in a digital form.

FIG. 4 schematically illustrates this architecture. FIG. 4 shows a block circuit diagram of a DSP card 10 which receives data relating to the analog signals to be generated from a data server 20, for example via Gbit Ethernet. The DSP comprises, as central units, a processor 10P, in this case an FPGA, and two frequency converters 10F1 and 10F2. The processor 10P generates, based on the data obtained from the data server 20, IQ signals by means of which the frequency converters 10F1 and 10F2 are fed. Each of these frequency converters 10F1 and 10F2 is associated to a certain frequency band and produces, in this frequency band starting from the IQ data obtained, analog signals which are output via the HF outputs 10H1 and 10H2. This architecture allows each of the emitters 10F1 and 10F2 to be able to dynamically change delay, phase, amplitude and frequency independently of each other.

The architecture of the stimulator illustrated here is directed to continuous signals having a duration in an order of magnitude of seconds, for example, which is reflected in the potential sample rates and signal bandwidths. Additionally, the architecture illustrated here comprises a RAM memory 10S with a capacity of 4 Gigabytes, for example, buffering data in order to at least partly compensate disadvantages of a limited bandwidth when streaming, for example. Considering the system illustrated here, there is demand for larger frequency ranges, larger real-time bandwidths and higher dynamics.

Additionally, in the field of radar simulation (generating a plurality of HF pulses on different levels), it is conventional to operate a small number of analog control transmitters which are able to quickly change their transmission frequency, in a time-multiplex manner.

Therefore, the object underlying the present invention is providing a signal stimulator offering an improved compromise between frequency range, real-time bandwidth, dynamic requirements and operability.

SUMMARY

According to an embodiment, a high-frequency signal stimulator system may have: at least two mutually independent data producers, each configured to produce at least one data packet, describing a high-frequency signal to be produced, having IQ data; signal processing configured to extract contents of the data packet produced by the first of the at least two mutually independent data producers and contents of the data packet produced by the second of the at least two mutually independent data producers; and a signal generator configured to produce a high-frequency signal based on the extracted contents; wherein the at least one data packet has IQ data associated to at least two and/or to at least several frequency bands and wherein the signal generator is configured to produce the high-frequency signal over the at least two or the at least several frequency bands which are adjacent to one another or overlap one another; or wherein the at least one data packet has IQ data associated to at least two and/or to at least several frequency bands and wherein the signal generator has at least two signal generator units for at least two of the at least two or the at least frequency bands which are adjacent to one another or overlap one another; wherein the at least two mutually independent data producers are mutually independently operated computers.

According to another embodiment, a method for stimulating a high-frequency signal may have the steps of: producing a data packet, describing a high-frequency signal to be produced, having IQ data by a first of at least two mutually independent data producers, and producing a data packet, describing a high-frequency signal to be produced, having IQ data by a second of two independent data producers; extracting the contents of the data packet produced by the first of the at least two mutually independent data producers and the data packet produced by the second of the at least two mutually independent data producers; and producing a high-frequency signal based on the extracted contents using a signal generator; wherein the at least one data packet has IQ data associated to at least two or to at least several frequency bands and wherein the high-frequency signal is produced over the at least two or the at least several frequency bands which are adjacent to one another or overlap one another; or wherein the at least one data packet has IQ data associated to at least two or to at least several frequency bands and wherein at least two signal generator units for at least two of the at least two or the at least frequency bands which are adjacent to one another or overlap one another are used; wherein the at least two mutually independent data producers are mutually independently operated computers.

Still another embodiment may have a non-transitory digital storage medium having stored thereon a computer program for performing a method for stimulating a high-frequency signal, having the steps of: producing a data packet, describing a high-frequency signal to be produced, having IQ data by a first of at least two mutually independent data producers, and producing a data packet, describing a high-frequency signal to be produced, having IQ data by a second of two independent data producers; extracting the contents of the data packet produced by the first of the at least two mutually independent data producers and the data packet produced by the second of the at least two mutually independent data producers; and producing a high-frequency signal based on the extracted contents using a signal generator; wherein the at least one data packet has IQ data associated to at least two or to at least several frequency bands and wherein the high-frequency signal is produced over the at least two or the at least several frequency bands which are adjacent to one another or overlap one another; or wherein the at least one data packet has IQ data associated to at least two or to at least several frequency bands and wherein at least two signal generator units for at least two of the at least two or the at least frequency bands which are adjacent to one another or overlap one another are used; wherein the at least two mutually independent data producers are mutually independently operated computers, when said computer program is run by a computer.

Embodiments of the present invention provide a high-frequency signal stimulator system comprising at least two mutually independent data producers, signal processing and a signal generator. The at least two mutually independent data producers, like two PCs distributed over a network, are each configured to produce at least one data packet describing a high-frequency signal to be produced. The signal processing is configured to extract contents of the data packet produced by the first of the at least two mutually independent data producers and contents of the data packet produced by the second of the at least two mutually independent data generators. The signal generator is configured to produce a high-frequency signal based on the extracted contents.

Embodiments of the present invention are based on the finding that, starting from a high-frequency signal stimulator, in signal generation, an upstream signal processing configured to sort the data obtained and associate thereto a respective channel for interpolation and audio signal generation, allows data generation (data relating to the high-frequency signals to be produced by means of the high-frequency signal stimulator) to take place in a distributed manner. The pre-processing basically takes place in real time, offering the advantage that, in this way, not all the data to be produced have to be buffered before. Additionally, the data processing also allows operating a considerably larger number of emitters, since a fixed association is no longer required. This allow realizing an extension of the frequency range and real-time bandwidth.

Corresponding to further embodiments, the signal generator comprises several frequency bands across which the high-frequency signal is produced. These bands can be adjacent to one another or overlapping. Here, in correspondence with embodiments, the signal generator can comprise at least two signal generator units for at least two frequency bands. Expressed differently, this means that each signal generator unit is configured to produce the high-frequency signal in the respective frequency band such that the one high-frequency signal can be combined from the two output signals output by the signal generator units. In correspondence with further embodiments, a so-called filter combiner can be used here, configured to combine the output signals from the at least two signal generator units such that a high-frequency signal having an overall bandwidth is obtained. The overall bandwidth can, for example or at most, be the sum of the at least two frequency bands. When taking another embodiment, in accordance with which the individual frequency bands are arranged to be overlapping, the overall bandwidth is smaller than the sum, but comprises the at least two overlapping frequency bands (at least as far as content is concerned). In correspondence with further embodiments, the signal generator can comprise two or more signal generator units per frequency band. Depending on the bandwidth, the number may also be considerably greater than two, like 20, for example, in the C/D or E-J band. The frequency range and the real-time bandwidth can be increased considerably by the plurality of the signal generator units.

In correspondence with embodiments, each signal generator unit comprises at least one digital-to-analog converter or a combination of a digital-to-analog converter and a frequency converter. The digital-to-analog converter is configured to provide an analog signal starting from the contents of the data packet generated, wherein the optionally downstream frequency converter transfers the analog signal provided to another frequency range. Additionally, in correspondence with further embodiments, in the DA converter or the frequency converter, an amplification-attenuation unit can be provided, configured to amplify or attenuate the analog signals. This allows achieving an increased dynamics range.

In correspondence with embodiments, the upstream signal processing is configured to extract, when extracting the contents (like the IQ contents), an emission point in time or signal duration and to arrange the contents of the signal packets correspondingly in order to output a continuous data stream. In correspondence with embodiments, the gaps between individual signals in the case of a non-continuous data stream, are filled up by the signal processing. This means that it is possible to reproduce both pulses and continuous signals. In correspondence with further embodiments, the signal processing also extracts the frequency ranges contained and correspondingly associate the digital signals to the downstream signal generator units of the signal generator. This allows considering frequency-agile signals which may exceed the frequency limits between two blocks.

This concept is applicable to both offline and online applications. This means that receiving the data packet, sorting and producing the analog high-frequency signal can take place either in real time or also using a memory. This means that, in correspondence with embodiments, the high-frequency signal stimulator system or signal processing can comprise a memory configured to buffer the data packets received and, after associating these, for example to a respective band and/or time slot, generate the signals.

When emphasis is placed on a low latency relative to the control information when simulating the high-frequency signals, the control information can also be transferred via a separate channel of minimum latency. The fixed time relation between data (IQ) and control information (level, phase position) is usually lost here. These control information can be received via the data packets, for example, which in this case comprise metadata in the first place, but not necessarily IQ data. In correspondence with embodiments, the signal processing is configured to pass the metadata, as control data (also without IQ data or separately), on directly to the signal generator in order to keep the latency time small.

In correspondence with embodiments, the signal processing can further be configured to analyze and, if applicable, interpolate the contents of the data packets. In order to be able to react to different data packet numbers and data packet sizes in a more dynamic manner, in correspondence with further embodiments, the signal processing can be configured to stimulate several virtual exciters and to associate the data packets to the virtual exciters in correspondence with their contents. Starting with the virtual exciters, the correspondingly associated signal generator units of the signal generator are then addressed. In correspondence with embodiments, it is also possible for the number and/or the bandwidth of the several virtual exciters to vary during operation.

It is to be mentioned here that, in correspondence with embodiments, when extracting or passing the data to the signal generator or the signal generator units, signal contents and signal descriptions (metadata) can be processed separately. In accordance with an embodiment, it is possible for the signal contents and the description to be transferred to the signal generator separately or, in accordance with another embodiment, for these to be provided to the signal generator together.

It is to be mentioned here that, in correspondence with embodiments, the signal processing comprises a processor or FPGA outputting a continuous data stream based on the data packets obtained from several signal sources. In order to obtain the several data packets from several independent data generators, the signal processing can additionally comprise a switch via which the at least two mutually independent data producers are coupled to the signal processing.

In correspondence with embodiments, each of the at least two data generators generates a data packet with at least one element from the group of elements comprising IQ data, a target address, a frequency range, an emission point in time, a signal duration and/or signal level. Each of the data packets can exemplarily describe a radar object. It is to be mentioned here that, in correspondence with embodiments, each data producer can exemplarily be an independently operated computer/PC.

Another embodiment provides a method for stimulating a high-frequency signal, comprising the steps of:
producing at least two data packets, each data packet describing a high-frequency signal to be generated, wherein generating is performed in a mutually independent manner.
extracting the contents of the at least two data packets and producing a high-frequency signal based on the extracted contents, using a signal generator. In accordance with further embodiments, the method can also comprise the method steps of arranging the extracted contents in correspondence with the emission points in time and the signal duration and/or associating the contents to at least two bands, in correspondence with their frequency ranges.

In correspondence with further embodiments, the method comprises the step of associating the contents to virtual exciters. In correspondence with further embodiments, the method comprises the step of filling gaps between individual signals with zeros or at least one or several frames, in the case of a non-continuous data stream, in order to produce a continuous data stream.

In correspondence with another embodiment, a computer program executing all of or the steps of the method discussed above is provided.

BRIEF DESCRIPTION OF THE DRAWINGS

Embodiments of the present invention will be discussed below referring to the drawings, in which.

DETAILED DESCRIPTION OF THE INVENTION

Figure 1A:
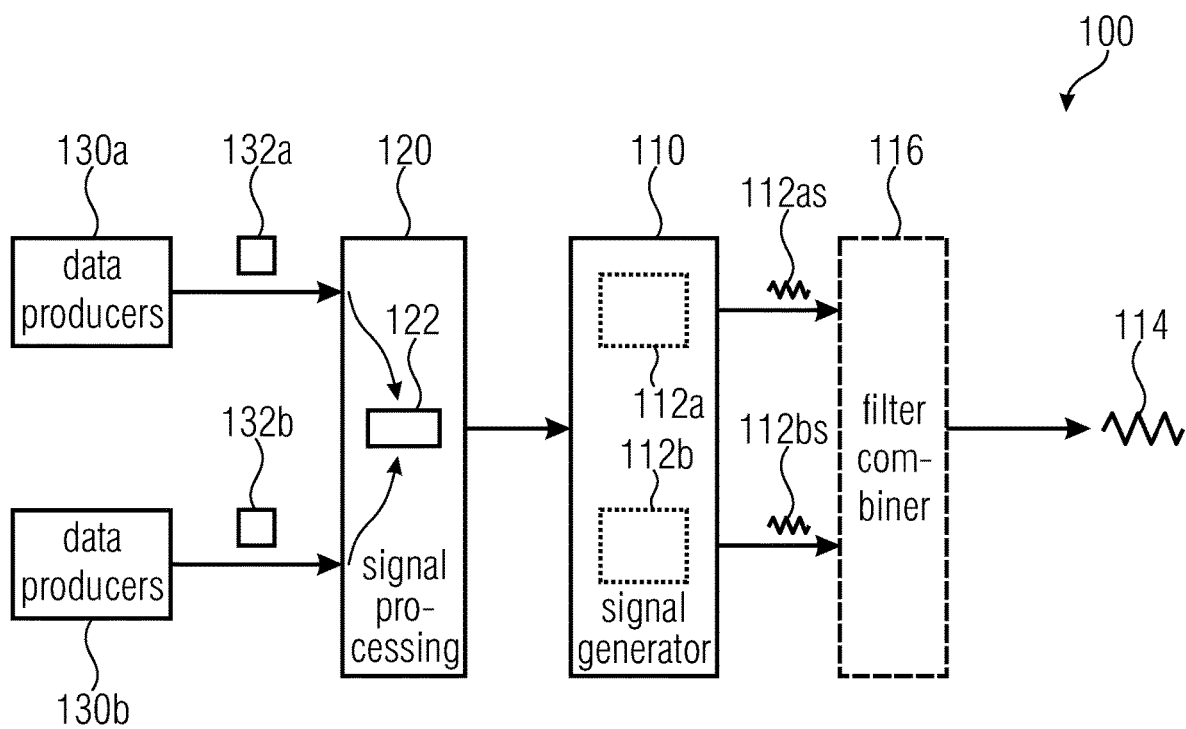
FIG. 1a shows a schematic block circuit diagram of a high-frequency stimulator system in accordance with a basic embodiment.

Before discussing embodiments of the present invention referring to the appended drawings, it is to be pointed out that elements and structures of the same effect are provided with same reference numerals so that the description is mutually applicable and exchangeable.

FIG. 1a shows a system 100 for high-frequency signal stimulation. In the basic configuration, it comprises three units: a signal generator 110, upstream signal processing 120 and at least two mutually independent data producers 130a and 130b. The independent data producers 130a and 130b, like two computers, for example, each output a data packet 132a and 132b to the signal processing 120. Each of the data packets describes a high-frequency signal 114 to be produced, that is can comprise IQ data, a frequency range, target address, emission point in time, signal duration and/or signal level, for example.

The signal processing 120 extracts the contents of the data packets 132a and 132b and merges these to form a data stream 122, for example, in which the signals to be produced described by the data packets 132a and 132b are sorted/arranged in correspondence with their emission points in time, duration and frequency range. This data stream 120 comprises the IQ data in corresponding structuring and, may be, already divided per bands. This data stream is then provided to the signal generator 110 so that the same provides a high-frequency signal 114 using the same.

It is to be pointed out here that the IQ data or, expressed in a generalizing manner, the data packets can both be provided separately by the independent data producers 130a and 130b and also be present already, like in a way buffered in a memory.

In correspondence with further embodiments, the signal generator 110 can comprise several signal generator units 112a and 112b. Each of these signal generators 112a and 112b is responsible for a certain frequency band. Dividing to the two frequency bands in a way associated to the signal generator units 112a and 112b is performed by the pre-processing 120. In correspondence with embodiments, the number of the signal generator units 112a and 112b is of course not limited to two so that, all in all, a greater number of bands can be covered or several signal generator units be provided within each band. In correspondence with an embodiment, the signal generator units 112a and 112b each output a signal in their own frequency band which here is marked by the reference numerals 112as and 112bs. These two signals 112as and 112bs are processed in an optional filter combiner 116 which generates, starting from the two or more analog output signals 112as and 112bs in the two or several frequency bands arranged next to one another or partially overlapping frequency bands, an overall high-frequency signal 114 having an overall bandwidth. This overall bandwidth can exemplarily consist of the sum of the individual bandwidths of the signals 112as and 112bs or, in case the signals overlap, be smaller, wherein in this case the entire contents of the output signals 112as and 112bs are contained therein.

The data packet 132a correspondingly comprises first IQ data, whereas the data packet 132b comprises second IQ data. Both the first and the second IQ data (or each on their own) can comprise contents/IQ data belonging to a first and a second frequency band. In correspondence with an embodiment, the first frequency band is generated by a first signal generator unit 112a, whereas the second frequency band is generated by a second signal generator unit 112b.

In correspondence with embodiments, the IQ data of one or several data packets 132a/132b are distributed to individual frequency bands by the signal processing 120. Here, the IQ data are extracted and divided in dependence on the frequency. The result may be that both a part of the first and of the second IQ data are directed to a frequency band.

Figure 1B:
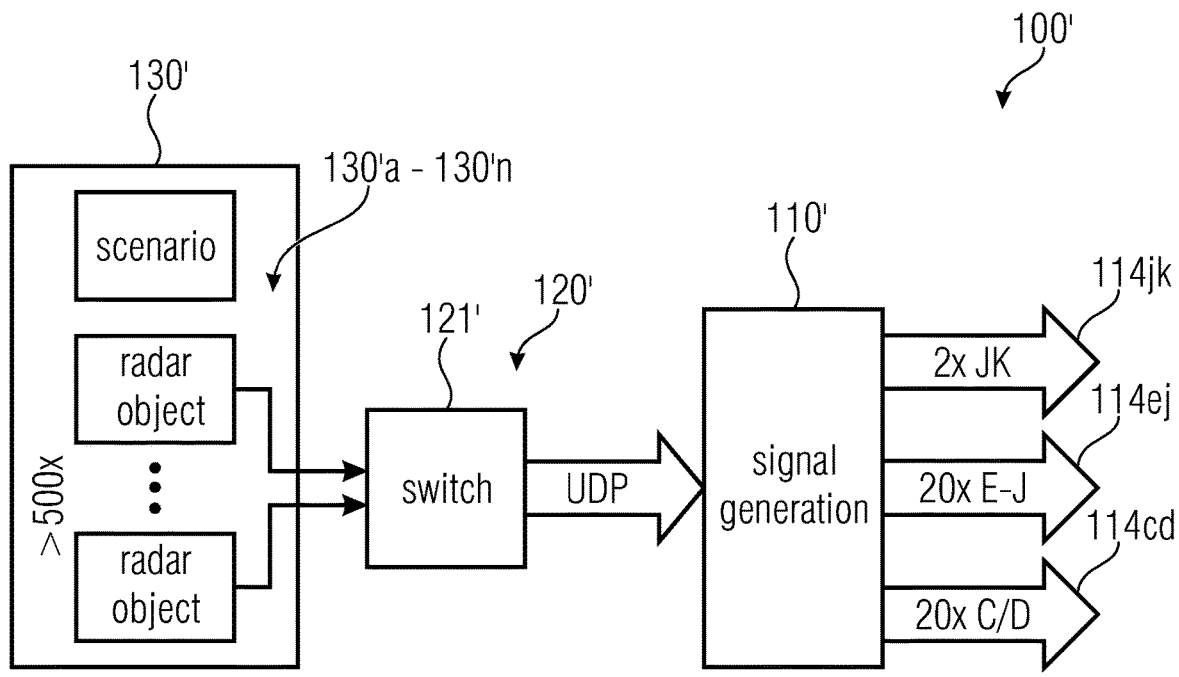
FIG. 1b shows a schematic block circuit diagram of a high-frequency stimulator system in accordance with an extended embodiment.

Another embodiment will be discussed below referring to FIG. 1b. FIG. 1b shows an architecture 100' having a plurality of data sources 130'a-n, wherein these in this embodiment each are radar objects. All the radar objects 130'a-n (more than 500, for example) are generated separately and provided to the switch 121', which is part of the signal processing 120'. As has been discussed before, this switch 121' performs the signal pre-processing and provides the data processed in this way (cf. UDP) to the signal generation 110'. The individual blocks 130', 120' and 121' and 110' will be discussed in greater detail below.

Block 130' symbolizes the distributed data generation. Here, the data are generated separately for each radar object (cf. 130'a to 130'n), like by means of software, for example. If a pulse or signal is to be passed to the DUT, the software will produce a data packet (pulse word descriptor) having the desired data contents (like IQ data) and meta information, like level and emission point in time, for example, etc. Data generation may be performed in a way distributed to different computers 130'a to 130'n.

The data are collected using a powerful network switch 121-1 and directed to the signal generation 110'. Signal pre-processing takes place in the unit 120' which can be arranged either at the switch 121' or the signal generation 110'. The signal processing 120' sorts the packets, associates the same to a channel for interpretation and transmits the corresponding signals to the DA converters of the signal generation 110'. In this embodiment, it is assumed that the signal generation 110' has several channels and, consequently, several DA converters. The channels are characterized by the reference numerals 114JK, 114E-J and 114C/D. Up to 22 GHz real-time bandwidth are, for example, available here due to the no-gap overlapping frequency blocks 114JK, 114E-J and 114C/D. Corresponding calibration means (not illustrated) allows measurements and subsequent corrections of the analog frequency responses of this system. Subsequently, the high-frequency portion 110' will be discussed in detail band per band, wherein reference here is made to FIGS. 2a and 2b, representing potential implementations of the signal generation 110'.

Figure 2A:
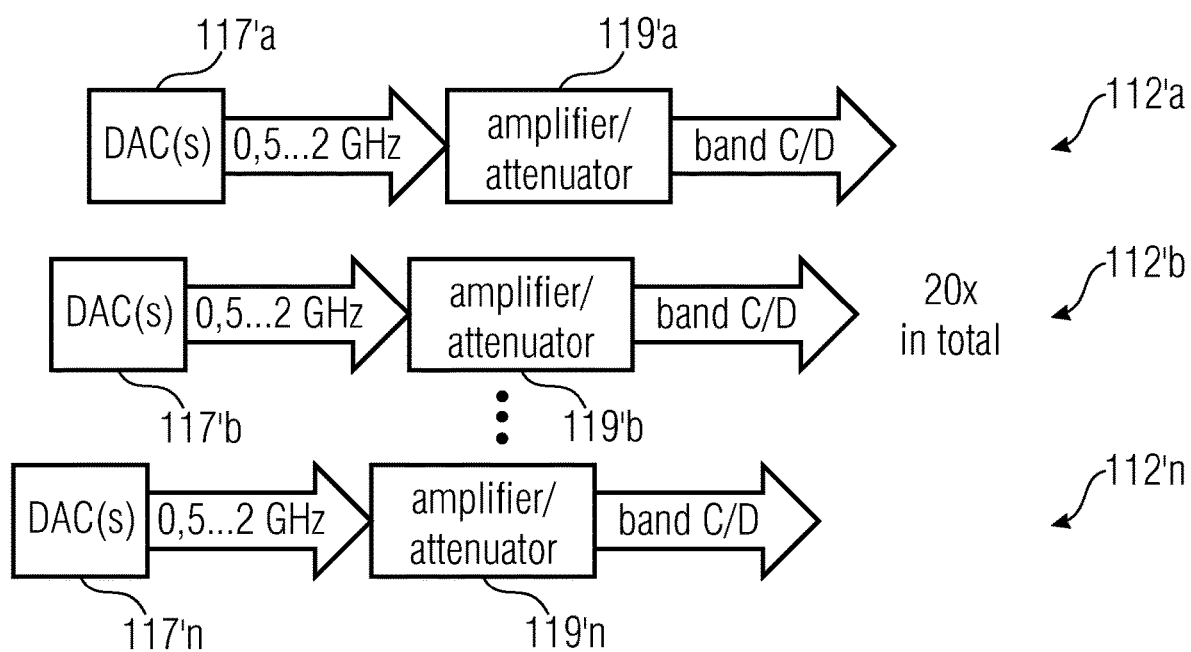
FIGS. 2a, 2b show schematic block circuit diagrams for illustrating potential implementations of the signal generator in accordance with embodiments.

FIG. 2a schematically shows three signal generation units 112'a to 112'n. Each of these signal generation units 112'a to 112'n in this embodiment is formed by a combination of a digital-to-analog converter 117'a to 117'n and an optional amplification-attenuation unit 119'a to 119'n. The signal amplification-attenuation units 119'a to 119'n are downstream of the respective digital-to-analog converters 117'a to 117'n. It is to be mentioned here that, in correspondence with further embodiments, the number of these signal conversion units 112'a to 112'n generally is greater than 1 but may advantageously be greater than 2 (like 20, for example).

The number varies depending on the real-time bandwidth used. A desired real-time bandwidth of 1.5 GHz in the frequency range from 0.5 to 2 GHz (C and D bands) is assumed here. Considering the DA conversion employed and, in particular, the specified spectral purity and the specified signal-to-noise distance, the result is a potential bandwidth per DA converter 117'a to 117'n, from which point of view the number results for the desired real-time bandwidth. It is to be mentioned here that the signal generation 112'a to 112'n in the C and D bands illustrated here can be performed directly and with no further signal conversion, which allows an optimum signal quality. In order to take the sound range used into consideration, the amplification-attenuation units 119'a to 119'n are employed, per HF path 112'a to 112'n, which are implemented to be quickly switching and, in accordance with embodiments, are driven directly by the FPGA (pre-processing 120'). These amplification-attenuation units 119'a to 119'n adjust the amplification during the duration of a pulse. As soon as several pulses overlap in time within a frequency block, the power of the strongest pulse will determine the noise ground.

Figure 2B:
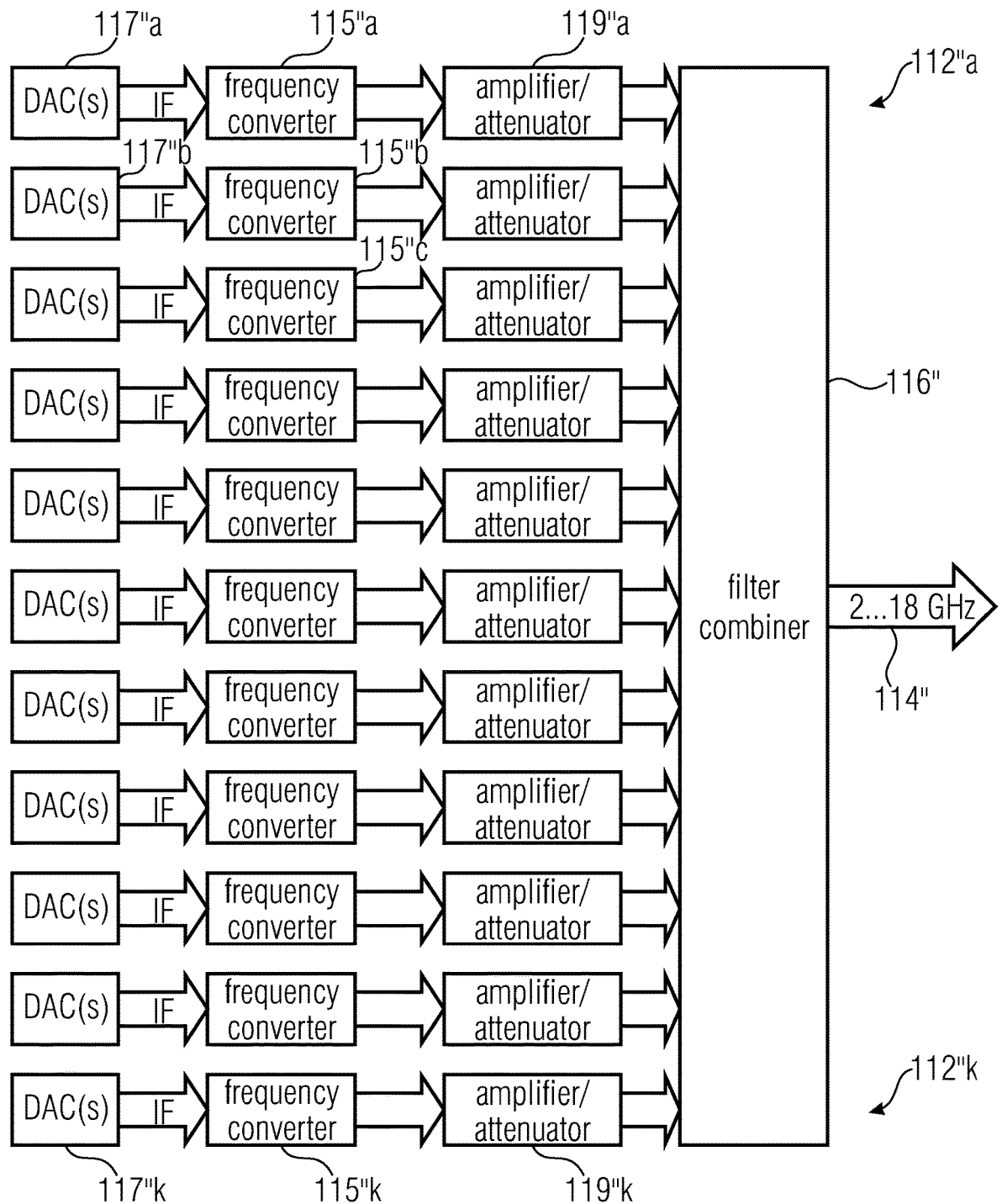

FIG. 2b shows a potential implementation of the signal generation 110' for the E to J band or the JK band. Here, 11 signal generation units 112"a to 112"k, for example, are provided with the signal generation 110'. Each of these signal generation units 112"a to 112"k in turn comprises a digital-to-analog converter 117"a to 117"k and the downstream amplification-attenuation units 119"a. Frequency converters 115"a and 115"k are provided between all the units 117"a to 117"k and the units 119"a and 119"k. Additionally, the signal generation illustrated here comprises a so-called filter combiner 116" which combines a total of 11 bands belonging to the signal generation units 112"a to 112"k to form an output signal 114".

In the implementation illustrated in FIG. 2b, the E to J bands are covered in that several (>3) of the 1.5 GHz-wide sub-bands are summed up by filter combiners 116" after a simple analog frequency conversion (cf. DAC 117"a to 117"k). Advantageously, but not necessarily, the sub-bands overlap so that a no-gap real-time bandwidth (for example 16 GHz, i.e. from 2 to 18 GHz) is formed by means of a digital equalizer and, therefore, signal processing. The overlap can be recognized by the frequency bands output by the frequency converters 115"a to 115"k (see arrow of the frequency conversion unit 15"a to 150"k). Thus, the frequency band of the frequency converter 115"a (2 to 3.5 GHz), for example, overlaps with the frequency band of the frequency converter 115"b (3.45 to 4.95 GHz) by 0.05 or, generally, at least 0.01 GHz (max. 0.5 GHz), wherein this band in turn overlaps with the band of the frequency converter 115"c (4.9 to 6.4 GHz). In accordance with embodiments, the filter combiner 116" can be implemented as follows. In accordance with embodiments, apart from purely uniting the signals of paths 112"a to 112"k, the filter combiner 116" may also be configured to attenuate out-of-band disturbances and out-of-band noise. The result is a high spectral purity of the output signal 114".

In correspondence with further embodiments, the JK band is implemented in an analog manner, wherein in this case a frequency converter may be connected downstream thereof and super-positioning with the E to J units is done pursuant to the same principle (key word filter combiner).

Figure 3:
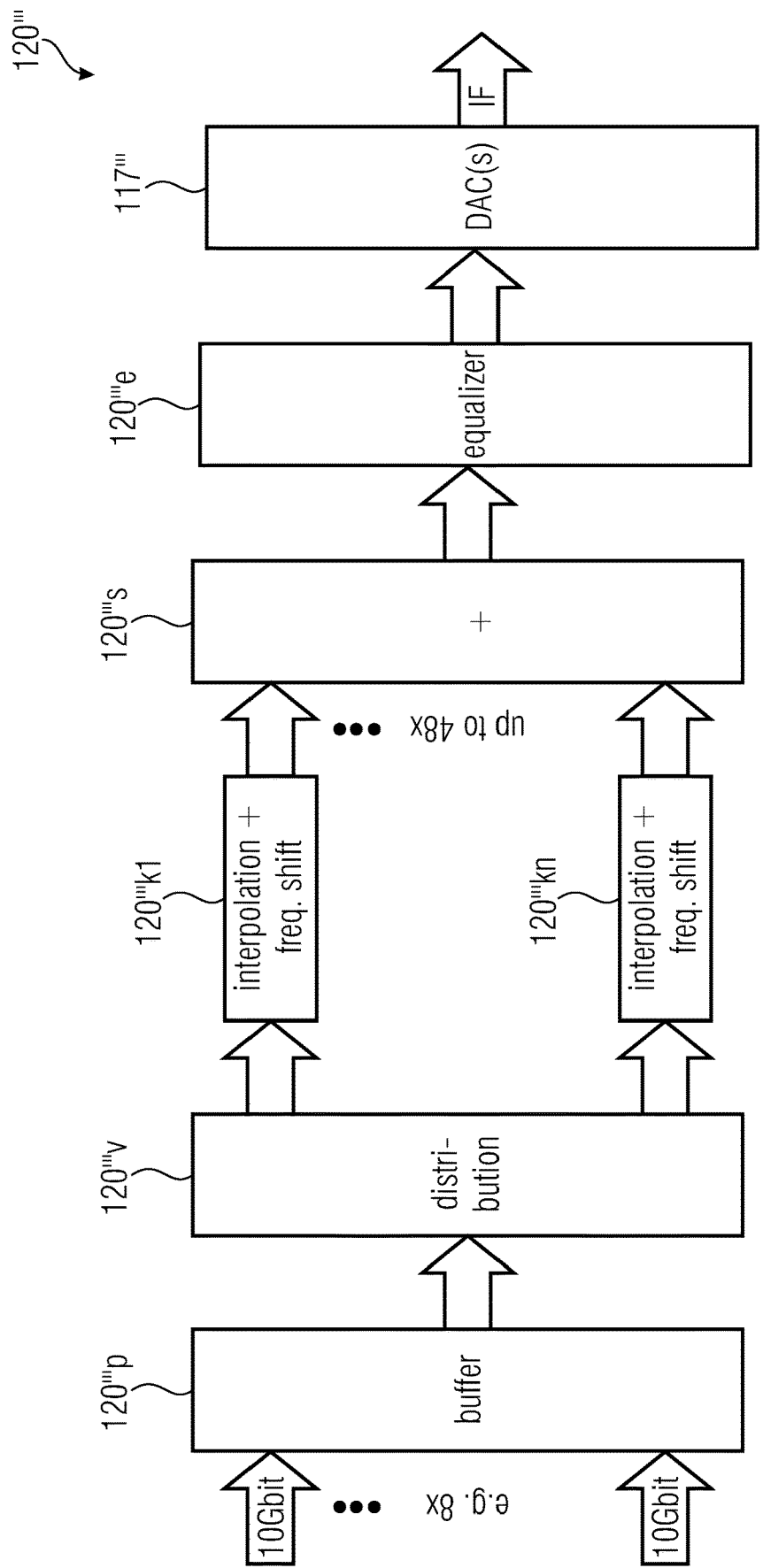
FIG. 3 shows a schematic block circuit diagram for illustrating the implementation of the signal processing in accordance with an embodiment.
Figure 4:
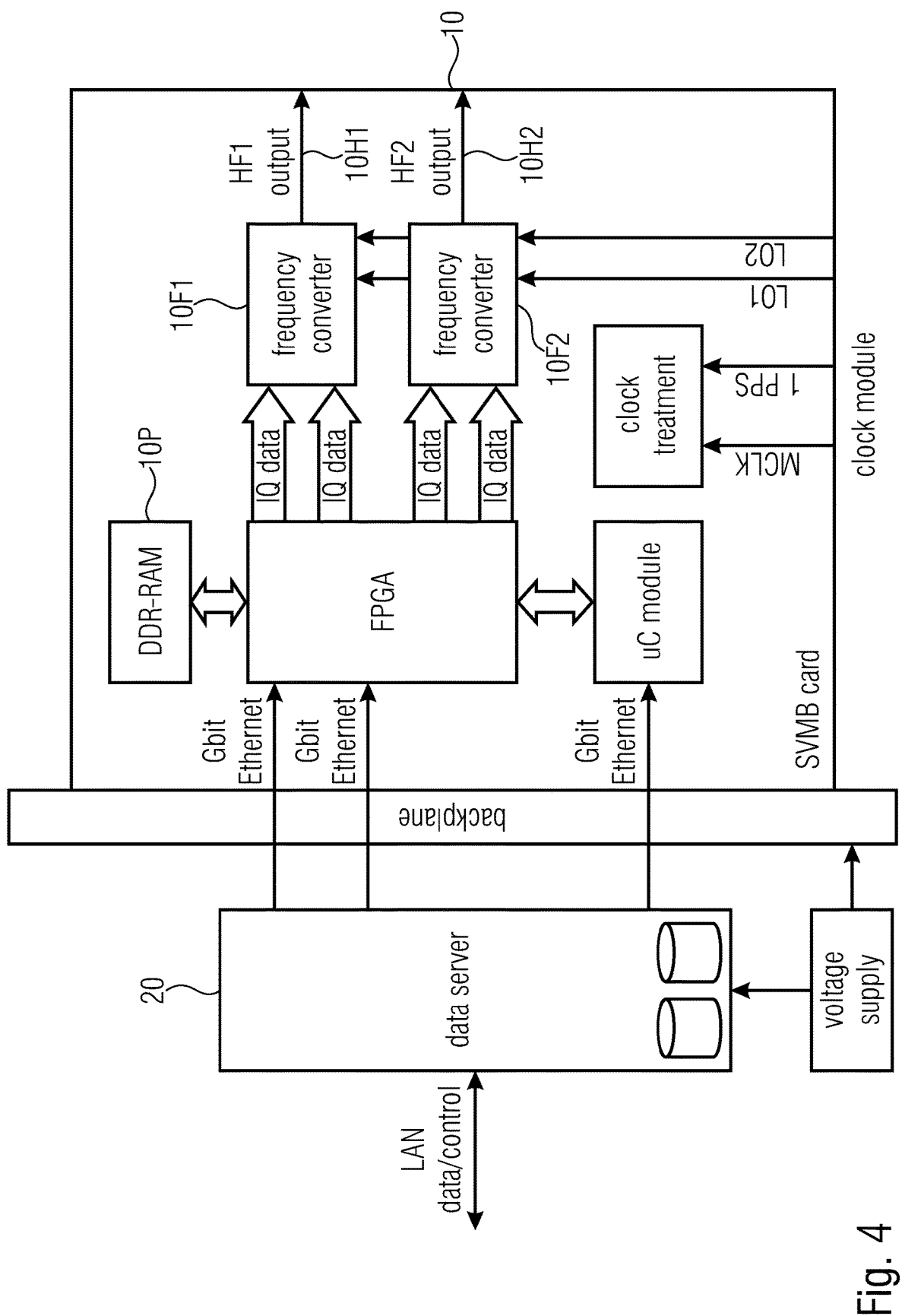
FIG. 4 shows a schematic illustration of a high-frequency signal stimulator architecture in accordance with the known technology.

Making reference to FIG. 3, the signal processing, which here exemplarily can be implemented as a FPGA, will be discussed below. FIG. 3 shows signal processing 120''' outputting the signal to be digitalized to the digital-to-analog converter 117'''. The signal processing in the implementation illustrated here comprises an input-side buffer 120'''p which obtains the data via 18 Gigabit inputs, for example. These UDP packets received via the switch (not illustrated). Buffing takes place pursuant to the FIFO principle with a memory depth of several seconds. Starting from the buffer, the data are then distributed in the data distribution 120'''v. Here, a distribution to different channels takes place, which are exemplarily characterized by the reference numerals 120'''k1 to 120'''kn. Exemplarily, up to 48 channels or even a greater number of channels can be used. The channels may, for example, be a virtual exciter which comprises the interpolation factor entailed and has free capacities left. Interpolation and frequency shifting take place in the individual channels 120'''k1 to 120'''kn. The signals pre-processed in this way from the individual channels 120'''k1 to 120'''kn are summed up in the unit 120'''s after interpolation and rendered to form an output signal which can be corrected using an optional equalizer 120'''e, wherein particularly a correction of the frequency response of the analog technology takes place, and it is made sure that neighboring frequency blocks are overlapped correctly. In accordance with embodiments, the ingoing PWDs can also be counted in the unit 120''' as to their ID so that it becomes traceable when data packets are discarded. In correspondence with embodiments, the distribution 120'''v is configured to read out the metadata of the PWDs and associate these to the individual exciters 120'''k1 to 120'''kn. Additionally, corresponding parameterization of the signal processing and the hardware takes place in real time.

Assuming two virtual exciters, a bandwidth of approximately 1 GHz can be expected, which can be operated continuously, wherein Doppler, phase and amplitude can be adjusted per sample. The maximum bandwidth of 1 GHz can be reduced in steps of 500 MHz, 250 MHz, 125 MHz and 16 MHz. A reduced sample rate results in a greater number of virtual exciters so that up to 48 virtual exciters can, for example, be expected. In correspondence with another embodiment, the distribution or the virtual exciters 120'''k1 to 120'''kn is/are configured to fill gaps between the pluses or semi-filled frames with zeros so that the result still is a continuous data stream.

In correspondence with an embodiment, with a 16-bit word width, a theoretically possible data throughput, of approximately 250 Gbits can be achieved without considering control data. When reducing the resolution to 8, the data rate would again be reduced to one half, with no control data. Another limiting factor is data passing, for example via eight 10-Gigabit interfaces. In order to eliminate this limit, in accordance with another embodiment, a 40-Gigabit interface or another interface of higher a data throughput can be employed so that the limiting factor is shifted towards data generation.

As has been discussed before, this limiting factor can be eliminated by data generation to be performed in mutually independent data sources, in particular independently of signal production.

Data generation: Each radar is represented in software by a corresponding radar "object", representing an independent data source. Each radar object knows its signal shapes, the simulated time and the current spatial orientation, as well as path attenuation between its radar and the DUT. When a pulse of the DUT is to be generated, the radar object generates a data packet in the sense of a PWD (pulse word descriptor) and, in correspondence with embodiments, may exemplarily comprise one or all of the following contents:

Target address describing the desired HF output and the frequency range
Metadata, like precise emission point in time, sample rate, center frequency, level, phase, signal form (pulse or continuous), ID of the radar object
IQ data to be transmitted The PWDs are transferred to a powerful network switch which avoids data collision, as UDP packets. If applicable, it distributes the PWD to several affected DSP cards by means of multicasting when the signal is to be transmitted in the region of an overlap. Using the ID, DSP cards are able to evaluate how many packets were received by a radar object up to a certain point in time in order to identify packet losses may be occurring. This concept in data generation exhibits the advantage of a clear separation between data generation and data production and consequently results in information safety. Furthermore, the concept is scalable relative to the number of radar objects and the distribution thereof to the computing hardware. Future security is ensured by using standard interfaces and, partly, standard hardware.

Subsequently, the analog side of the high-frequency signal stimulator will be discussed in greater detail: another advantage of the analog technology is that a good signal-to-noise distance can be expected, in particular when the corresponding DA converters are employed. Additionally, the analog part exhibits advantages relative to the frequency precision and the frequency switching time which, in this case, is negligibly small. Furthermore, the signals can be modelled completely freely, wherein both synthetic signals and recorded signals can be reproduced.

Another embodiment relates to the signal processing itself (with or without a limitation of the number of data producers) configured to produce a continuous data stream based on the contents of the data packets and/or to fill, in the case of a non-continuous data stream or an incomplete frame, the gaps between the individual signals or at least the individual frame with zeros. This filled-up (now may be even continuous) data stream can be made available to the signal generator, wherein it is ensured that at least the frames are complete.

Another embodiment relates to signal processing (with or without a limitation of the number of data producers), like an FPGA, for example, configured to process several signals (like for several radar objects) in parallel (in the sense of simultaneously). Several virtual exciters can be generated/processed here, for example, as described above. The processing in the processor may exemplarily be performed based on the concept of fast convolution.

Another embodiment relates to the signal generator (with or without a limitation of the number of data producers), wherein the high-frequency signal is produced in a way distributed over several frequency bands overlapping one another. Here, two or more signal generator units having overlapping frequency ranges may, for example, be provided.

Although some aspects have been described in the context of an apparatus, it is clear that these aspects also represent a description of the corresponding method, such that a block or device of an apparatus also corresponds to a respective method step or feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein.

Generally, in some embodiments, the methods are performed by any hardware apparatus.

This can be a universally applicable hardware, such as a computer processor (CPU), or hardware specific for the method, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A high-frequency signal stimulator system, comprising:
at least two mutually independent data producers, each configured to produce at least one data packet, describing a high-frequency signal to be produced, comprising IQ data;
signal processing configured to extract contents of the at least one data packet produced by a first of the at least two mutually independent data producers and contents of the at least one data packet produced by a second of the at least two mutually independent data producers; and
a signal generator configured to produce a first high-frequency signal based on the extracted contents;
wherein the at least one data packet comprises IQ data associated to at least two or to at least several frequency bands and wherein the signal generator is configured to produce the high-frequency signal over the at least two or the at least the several frequency bands which are adjacent to one another or overlap one another; or wherein the at least one data packet comprises IQ data associated to the at least two or to the at least several frequency bands and wherein the signal generator comprises at least two signal generator units for at least two of the at least two or the at least several frequency bands which are adjacent to one another or overlap one another;
wherein the at least two mutually independent data producers are mutually independently operated computers.

2. The high-frequency signal stimulator system in accordance with claim 1, wherein the signal processing is configured to associate the IQ data of the at least one data packet, belonging to a first frequency band, to a first of the least two signal generator units and to associate the IQ data of the same data packet, belonging to a second frequency band, to a second of least two signal generator units.

3. The high-frequency signal stimulator system in accordance with claim 1, wherein the signal generator comprises, per frequency band, another signal generator unit.

4. The high-frequency signal stimulator system in accordance with claim 1, wherein the signal generator comprises a filter combiner configured to combine output signals from the at least two signal generator units in order to acquire the high-frequency signal comprising an overall bandwidth, comprising a sum of the at least two frequency bands or at least the at least two overlapping frequency bands.

5. The high-frequency signal stimulator system in accordance with claim 1, wherein at least one of the at least two signal generator units comprising a digital-to-analog converter in combination with a frequency converter, wherein the digital-to-analog converter is configured to provide an analog signal starting from the contents of the produced data packets, and wherein the frequency converter is configured to transfer the provided analog signal in another frequency range.

6. The high-frequency signal stimulator system in accordance with claim 5, wherein the signal generator unit comprises at least one amplifier-attenuation unit downstream of the frequency converter, configured to amplify and/or attenuate the analog signal.

7. The high-frequency signal stimulator system in accordance with claim 1, wherein the signal processing is configured to extract, when extracting, at least one emission point in time and a signal duration and to arrange the contents of the at least one data packets in correspondence with the emission point in time and the signal duration in order to output a continuous data stream; and/or wherein the signal processing is configured to produce a continuous data stream based on the contents of the at least one data packets and/or to fill, in the case of a non-continuous data stream, gaps between the individual signals or frames of a signal with zeros.

8. The high-frequency signal stimulator system in accordance with claim 1, wherein the signal processing is configured to analyze and interpolate the contents of the at least one data packets; and/or wherein the signal processing is configured to associate the contents of the at least one data packets to different frequency bands of the signal generator in correspondence with their frequency ranges.

9. The high-frequency signal stimulator system in accordance with claim 1, wherein the signal processing is configured to simulate several virtual exciters and to associate the at least one data packets to one of the virtual exciters in correspondence with their contents.

10. The high-frequency signal stimulator system in accordance with claim 9, wherein the signal processing is configured to vary the number and/or the bandwidth of several virtual exciters in order to map the entire bandwidth with a varying number of virtual exciters.

11. The high-frequency signal stimulator system in accordance with claim 1, wherein the signal processing comprises an FPGA or processer outputting a data stream and/or a continuous data stream based on the contents of the at least one data packets.

12. The high-frequency signal stimulator system in accordance with claim 1, wherein the signal processing comprises a switch via which the at least two mutually independent data producers can be coupled to the signal processing.

13. The high-frequency signal stimulator system in accordance with claim 1, wherein the contents of the produced data packets comprise at least one element from the group comprising IQ data, a target address, a frequency range, an emission point in time, a signal duration and a signal level.

14. The high-frequency signal stimulator system in accordance with claim 1, wherein each data packet describes at least one radar object.

15. A method for stimulating a high-frequency signal, comprising:

producing a data packet, describing a first high-frequency signal to be produced, comprising IQ data by a first of at least two mutually independent data producers, and producing a data packet, describing a second high-frequency signal to be produced, comprising IQ data by a second of the two independent data producers;

extracting the contents of the at least one data packet produced by a first of the at least two mutually independent data producers and the at least one data packet produced by a second of the at least two mutually independent data producers; and producing the first and/or second high-frequency signal based on the extracted contents using a signal generator;

wherein the at least one data packet comprises IQ data associated to at least two or to at least several frequency bands and wherein the first and/or second high-frequency signal is produced over the at least two or the at least several frequency bands which are adjacent to one another or overlap one another; or wherein the at least one data packet comprises IQ data associated to at least two or to at least several frequency bands and wherein at least two signal generator units for at least two of the at least two or the at least several frequency bands which are adjacent to one another or overlap one another are used;

wherein the at least two mutually independent data producers are mutually independently operated computers.

16. The method in accordance with claim 15, wherein, when extracting the contents of the at least one data packet produced by the first of the at least two mutually independent data producers and the contents of the at least one data packet produced by the second of the at least two mutually independent data producers, these are ordered in correspondence with their emission point in time and their signal duration and/or associated to one or several of at least two bands of the signal generator in correspondence with their frequency range.

17. The method in accordance with claim 15, wherein, when extracting, at least two virtual exciters are simulated and the contents of the at least one data packets are associated to the virtual exciters.

18. The method in accordance with claim 15, wherein, when extracting, the contents are arranged to form a continuous data stream and, in the case of a non-continuous data stream, gaps between individual signals are filled with zeros, or at least one frame.

19. A non-transitory digital storage medium having stored thereon a computer program for performing a method for stimulating a high-frequency signal, comprising:

producing a data packet, describing a first high-frequency signal to be produced, comprising IQ data by a first of at least two mutually independent data producers, and producing a data packet, describing a second high-frequency signal to be produced, comprising IQ data by a second of two independent data producers;

extracting the contents of the at least one data packet produced by a first of the at least two mutually independent data producers and the at least one data packet produced by a second of the at least two mutually independent data producers; and producing the first and/or second high-frequency signal based on the extracted contents using a signal generator;

wherein the at least one data packet comprises IQ data associated to at least two or to at least several frequency bands and wherein the first and/or second high-frequency signal is produced over the at least two or the at least several frequency bands which are adjacent to one another or overlap one another; or wherein the at least one data packet comprises IQ data associated to at least two or to at least several frequency bands and wherein at least two signal generator units for at least two of the at least two or the at least several frequency bands which are adjacent to one another or overlap one another are used;

wherein the at least two mutually independent data producers are mutually independently operated computers, when said computer program is run by a computer.

* * * * *